(12) United States Patent
Allen

(10) Patent No.: US 9,757,830 B2
(45) Date of Patent: Sep. 12, 2017

(54) FENCING ASSEMBLY APPARATUS

(71) Applicant: Ronald P. Allen, Greenville, SC (US)

(72) Inventor: Ronald P. Allen, Greenville, SC (US)

( * ) Notice: Subject to any disclaimer, the term of this patent is extended or adjusted under 35 U.S.C. 154(b) by 175 days.

(21) Appl. No.: 14/560,100

(22) Filed: Dec. 4, 2014

(65) Prior Publication Data
US 2016/0160526 A1 Jun. 9, 2016

(51) Int. Cl.
| | |
|---|---|
| *B23P 11/00* | (2006.01) |
| *B23P 19/04* | (2006.01) |
| *B21D 31/02* | (2006.01) |
| *B21D 39/02* | (2006.01) |

(52) U.S. Cl.
CPC .............. *B23P 19/04* (2013.01); *B21D 31/02* (2013.01); *B21D 39/02* (2013.01)

(58) Field of Classification Search
USPC ...................... 29/243.5, 218.1–281.5; 269/37
See application file for complete search history.

(56) References Cited

U.S. PATENT DOCUMENTS

| | | | | | |
|---|---|---|---|---|---|
| 2,648,896 | A | * | 8/1953 | Krumm .................... | B25H 1/00 269/246 |
| 3,690,380 | A | * | 9/1972 | Grable .................... | E21B 43/11 166/229 |
| 5,427,297 | A | * | 6/1995 | Tymianski ............... | B21J 15/14 227/109 |
| 5,613,664 | A | * | 3/1997 | Svalbe ................... | E04H 17/003 256/19 |
| 6,824,123 | B2 | * | 11/2004 | Larsen ................ | E04H 17/1439 256/21 |
| 7,010,851 | B2 | * | 3/2006 | Cassese .................. | B27F 7/006 227/156 |
| 7,503,551 | B2 | | 3/2009 | Auret | |
| 7,681,294 | B2 | | 3/2010 | Payne | |
| 7,975,374 | B2 | * | 7/2011 | Williams ............. | B21D 39/044 29/243.53 |
| 8,141,407 | B2 | | 3/2012 | Lee et al. | |
| 8,899,555 | B2 | * | 12/2014 | Sherstad ............... | E01F 13/022 256/65.01 |
| 2005/0098771 | A1 | * | 5/2005 | DeMaere ............ | E04H 17/1408 256/65.02 |

(Continued)

FOREIGN PATENT DOCUMENTS

| | | |
|---|---|---|
| GB | 2348617 A | 10/2000 |
| WO | 2009070835 A1 | 6/2009 |

*Primary Examiner* — Larry E Waggle, Jr.
*Assistant Examiner* — Alvin Grant
(74) *Attorney, Agent, or Firm* — McNair Law Firm, P.A.; Douglas W. Kim

(57) ABSTRACT

An elongated support frame carrying a jig at a first section of the support frame. The jig receives a plurality of picket and rail fencing members in a pre-defined arrangement for assembly. A plurality of swedge guns are mounted to a gun platform. The gun platform is carried at a second section of the support frame so that distal ends of the swedge guns are aligned with a receiving section of the jig. At least one of the jig and the gun platform is slidable along the support frame so that the swedge guns are received into hollow interiors of the picket fencing members and repositionable along the length of the picket fencing members. The swedge guns are operable to form an indentation on an interior surface of the picket fencing members causing an interlocking engagement with one of the rail fencing members.

18 Claims, 15 Drawing Sheets

(56) References Cited

U.S. PATENT DOCUMENTS

2007/0080332 A1\* 4/2007 Allen .................. E04H 17/1439
                                                    256/65.11
2010/0264388 A1   10/2010 Duffy et al.
2013/0292621 A1   11/2013 Payne et al.
2015/0191923 A1\* 7/2015 Weiszbrod .............. B23P 19/04
                                                    29/430

\* cited by examiner

FENCING ASSEMBLY APPARATUS

BACKGROUND OF THE INVENTION

1) Field of the Invention

The present invention relates to the assembly of fencing members, and more particularly, to a system capable of constructing an entire fencing panel without the use of mechanical fasteners or welding.

2) Description of Related Art

Prior to the invention of the "swedge gun", the assembly of hollow tubular metal fencing members was accomplished with screws, welding, and the like. These process were time consuming, and in the case of using mechanical fasteners like screws, created issues with rust as the paint chipped off around the screws.

The "swedge gun", however, eliminated the need for mechanical fasteners and welding. The swedging process involves the use of a tool (swedge gun) that is inserted into the interior of the metal fence tubing. The tool then forms an indentation on the interior surface. The deformation is received in a complementary recess in an adjacent fencing member to interlock the two fencing members. For example, U.S. Pat. No. 5,224,256, incorporated herein by reference in its entirety, disclose a single swedge gun and the method of assembling tubular metal fencing members using such a swedge gun.

While the invention of the swedge gun was a major improvement over the use of mechanical fasteners, the swedge gun still has to be inserted into fencing member one at a time. Accordingly, assembly of an entire fencing panel is still a time intensive process for swedging each connection to be made.

Accordingly, it is an object of the present invention to provide a fencing panel assembly apparatus that overcomes the time consuming disadvantages and shortcomings associated with the prior art use of a single swedge gun for assembly of fencing panels.

SUMMARY OF THE INVENTION

The above objective is accomplished according to the present invention by providing a fencing assembly apparatus comprising an elongated support frame; a jig carried at a first section of the support frame; the jig adapted for receiving a plurality of picket and rail fencing members in a pre-defined arrangement for assembly; a plurality of swedge guns mounted to a gun platform; the gun platform carried at a second section of the support frame so that distal ends of the swedge guns are aligned with a receiving section of the jig; wherein at least one of the jig and the gun platform is slidable along the support frame so that the swedge guns are received into hollow interiors of the picket fencing members and repositionable along the length of the picket fencing members; and, wherein the swedge guns are operable to form an indentation on an interior surface of the picket fencing members causing an interlocking engagement with one of the rail fencing members.

In a further embodiment, each of the swedge guns include an elongated arm housing an actuator rod. The actuator rod is operatively associated with a swedging member carried at a distal end of the elongated arm, and wherein the swedging member is operable to form the indentation on the interior surface of the picket fencing members.

In a further embodiment, a plurality of arm brackets are carried on and laterally spaced across the gun platform, wherein each of the arm brackets carries one of the elongated arms of the swedge guns in a fixed arrangement.

In a further embodiment, a control bar is operatively connected to each actuator rod of the swedge guns, wherein movement of the control bar causes a simultaneous movement of each actuator rod for operating the swedging member.

In a further embodiment, the control bar is slidably carried on the gun platform, and wherein the control bar includes at least one track bracket slidably engaging a corresponding control track mounted on the gun platform to provide a uniform movement of the control bar along the direction of the control track.

In a further embodiment, a stop block is disposed along a movement path of the control bar, wherein the stop block engages the control bar to resist excess movement in a forward direction when operating the swedging member.

In a further embodiment, a first distal end of each actuator rod is adjustably and releasably connected to the control bar.

In a further embodiment, a control bar actuator is operatively connected to the control bar and operable to move the control bar between a first position in which the actuator rod bias the swedging member against the interior surface of the picket fencing members, and a second position in which the actuator rod is retracted so that the swedging member is not biased against the interior surface of the picket fencing members.

In a further embodiment, the swedging member comprises at least one swedge arm pivotally carried at the distal end of each of the elongated arms, and wherein the swedge arm includes a projection which when biased against the interior surface of the picket fencing members forms the indentation which creates a complementary shaped projection on an outer surface of the picket fencing members that is received into a complementary recess of an adjacent rail fencing member for interlocking engagement between the picket and rail fencing members.

In a further embodiment, the gun platform is laterally adjustable along a second axis perpendicular to a first axis extending in a direction parallel with the elongated support frame.

In a further embodiment, the gun platform includes a first base plate carrying the swedge guns on a top surface and having a track bracket carried on a bottom surface; the track bracket slidably engaging a guide track carried by a second base plate so that the first base plate is operable to shift laterally relative to the second base plate along the second axis.

In a further embodiment, the second base plate includes a track bracket slidably engaging a guide track carried on the support frame so that the second base plate is operable to move laterally along the first axis.

In a further embodiment, a drive unit is operatively associated with at least one of the jig and the gun platform for directing at least one of the jig and the gun platform along the support frame.

In a further embodiment, a series of rotatable stop members are laterally spaced along the support frame, wherein the stop members are rotatable between a first position in which movement of at least one of the jig and the gun platform past a given the stop member is prevented, and a second position which does not interfere with movement of at least one of the jig and the gun platform.

In a further embodiment, the jig includes a series of picket slots for receiving the picket fencing members, and a series of rail slots for receiving the rail fencing members.

In a further embodiment, the jig includes a plurality of rail clamps operable between an engaged position securing the rail fencing members in the rail slots, and a disengaged position allowing insertion and removal of the rail fencing members from the rail slots.

In a further embodiment, a first picket control bar is disposed generally at a first end portion of the jig, and a second picket control bar is disposed generally at a second end portion of the jig opposite the first end portion, wherein the first and second picket control bars extend perpendicular to a longitudinal axis of the picket slots. The first picket control bar is operable between an extended position engaging a first distal end of the picket fencing members for aligning and securing the picket fencing members in the picket slots, and a retracted position allowing insertion and removal of the picket fencing members. The second picket control bar is operable between an extended position engaging a second distal end of the picket fencing members for aligning and securing the picket fencing members in the picket slots, and a retracted position allowing insertion and removal of the picket fencing members.

In a further embodiment, the jig includes a track bracket slidably carried on a guide track mounted to the support frame for allowing lateral movement of the jig along the support frame.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
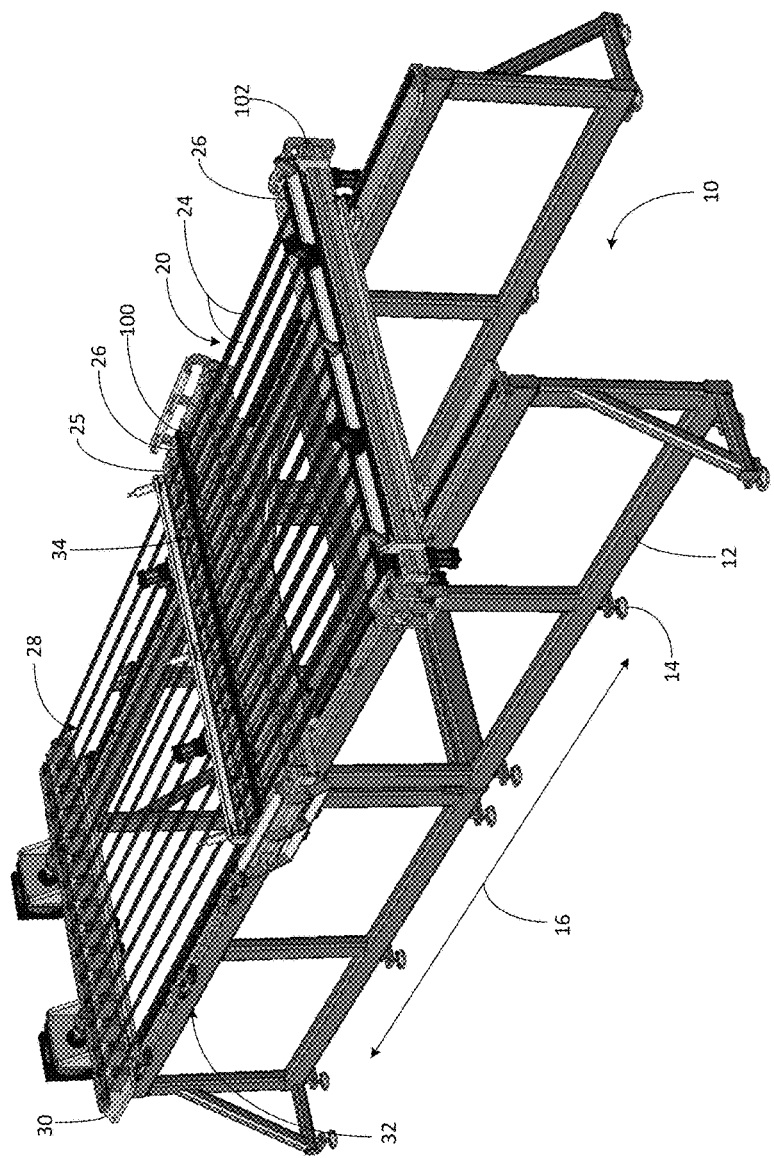
FIG. 1 shows a top perspective view of a fencing assembly apparatus according to the present invention.

It will be understood by those skilled in the art that one or more aspects of this invention can meet certain objectives, while one or more other aspects can meet certain other objectives. Each objective may not apply equally, in all its respects, to every aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment(s) and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples and figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 2:
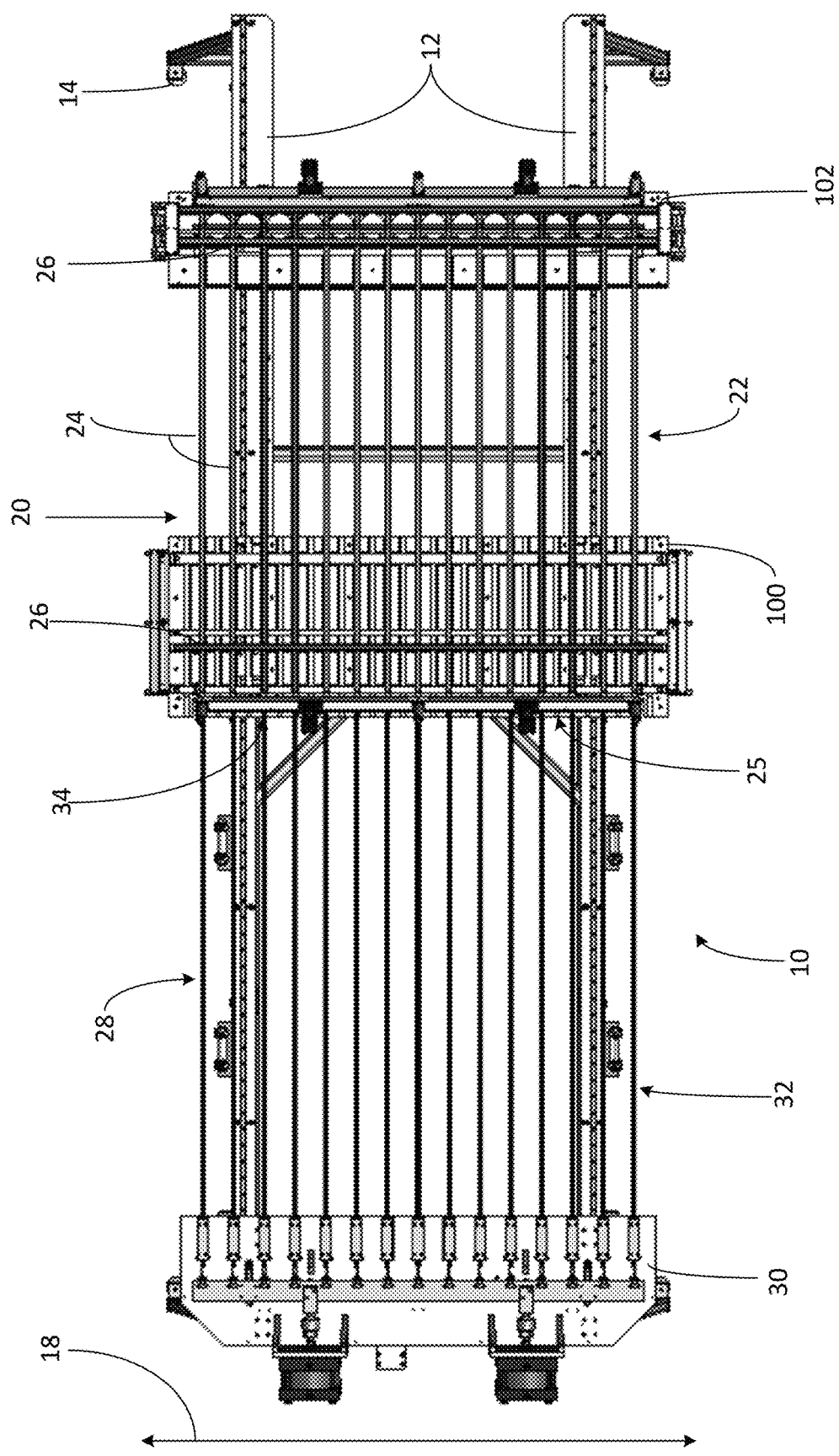
FIG. 2 shows a top view of the fencing assembly apparatus according to the present invention.

Referring to FIG. 1, a fencing assembly apparatus, designated generally as 10, is shown according to the present invention. The apparatus includes an elongated support frame 12, which provides a foundation for carrying the various components detailed herein below. Preferably, elongated support frame 12 includes a plurality of adjustable feet 14 for leveling of support frame 12. The elongation of support frame 12 extends in a direction along a first axis 16, defining a length of support frame 12. With further reference to FIG. 2, a second axis 18 is designated that extends in a direction perpendicular to first axis 16 and defines a width of support frame 12. Thus, as shown in the illustrated embodiments, the apparatus is longer than it is wide.

Figure 3:
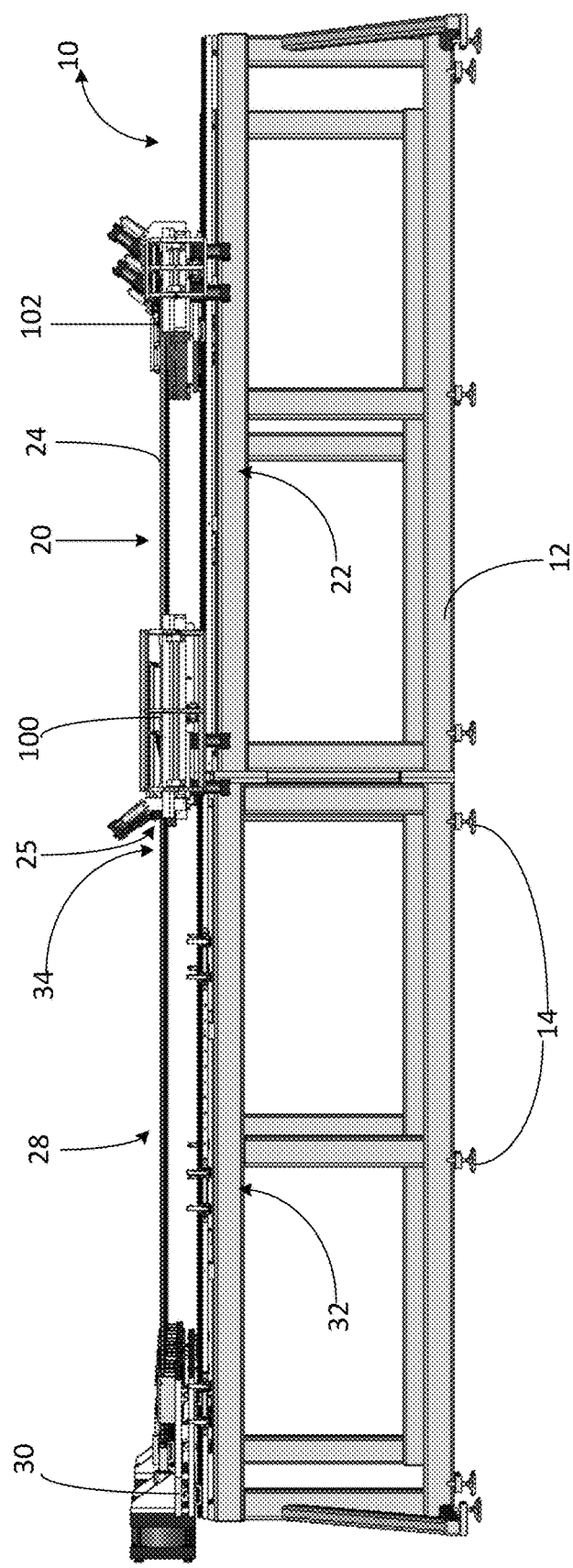
FIG. 3 shows a side view of the fencing assembly apparatus according to the present invention.

Referring to FIGS. 1-3, elongated support frame 12 carries a jig, designated generally as 20. Jig 20 is disposed along a first section, designated generally as 22, of elongated support frame 12. Jig 20 is adapted to receive a plurality of picket and rail fencing members in a pre-defined arrangement for assembly. Jig 20 operates to hold the picket and rail fencing members in position for simultaneously interlocking each of the picket fencing members 24 with a given rail fencing member 26.

Figure 10:
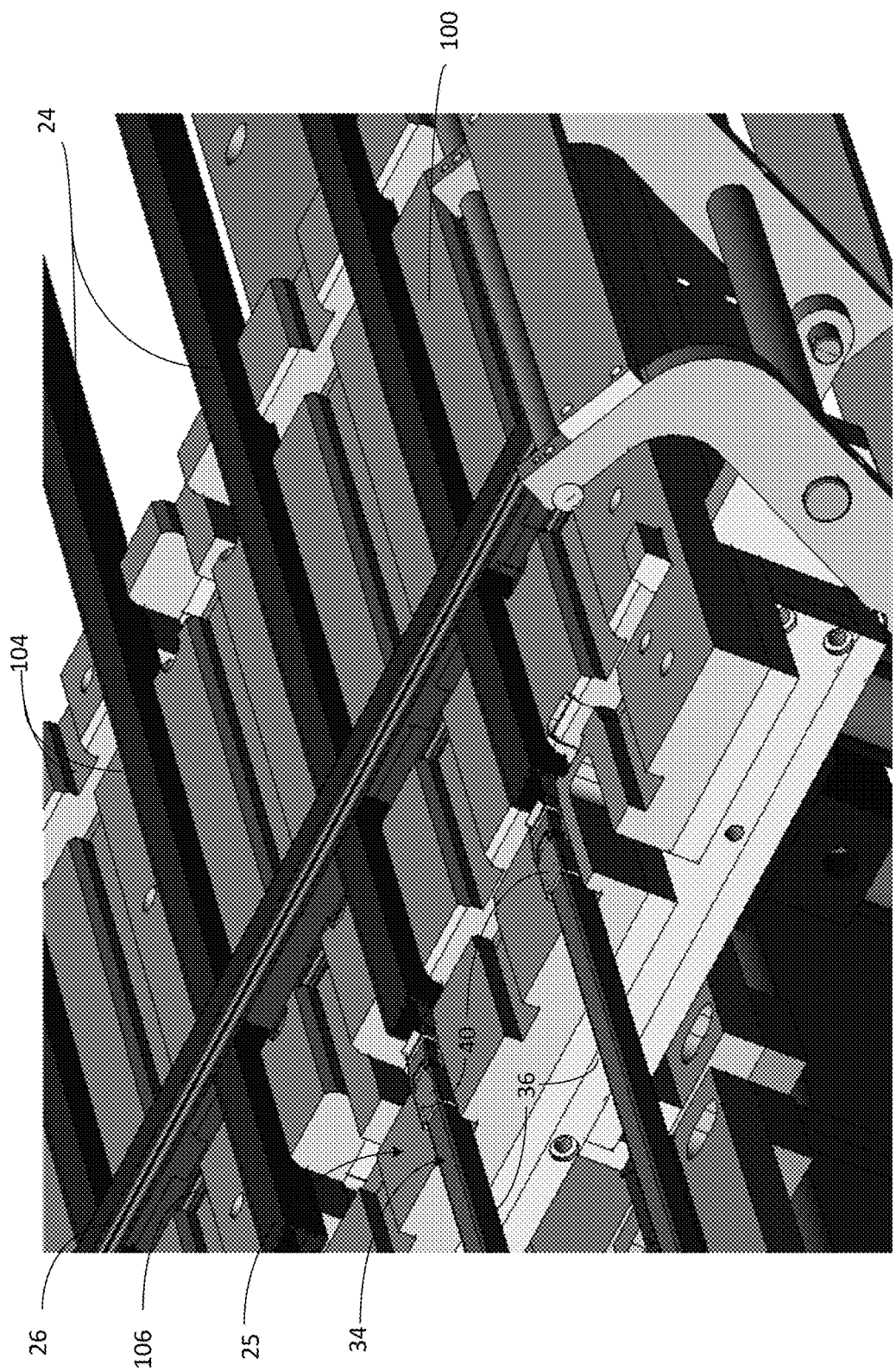
FIG. 10 shows a detailed top perspective view of a portion of the jig receiving a distal end portion of the swedge guns for insertion into a hollow interior of a plurality of picket fencing members according to the present invention.

Referring to FIGS. 1-3, a plurality of swedge guns, designated generally as 28, are mounted to a gun platform 30. Gun platform 30 is carried at a second section, designated generally as 32 of elongated support frame 12. Distal end, designated generally as 34, of swedge guns 28 are aligned with a receiving section 25 of jig 20, as best shown in FIG. 10. At least one of jig 20 and gun platform 30 is adapted for sliding along support frame 12 so that swedge guns 28 are received into hollow interiors of picket fencing members 24 and repositionable along the length of picket fencing members 24.

Referring to FIGS. 1-3, swedge guns 28 are operable to form an indentation on an interior surface of picket fencing members 24, simultaneously causing an interlocking engagement of all picket fencing members 24 with one of rail fencing members 26. The interlocking engagement between individual picket and rail members is accomplished in the same manner as detailed in U.S. Pat. No. 5,224,256, incorporated herein by reference in its entirety. The present invention, however, is capable of simultaneously interlocking multiple picket and rail fencing members, as opposed to an individual sequential interlocking of a given picket fencing member to a given rail fencing member.

Figure 4:
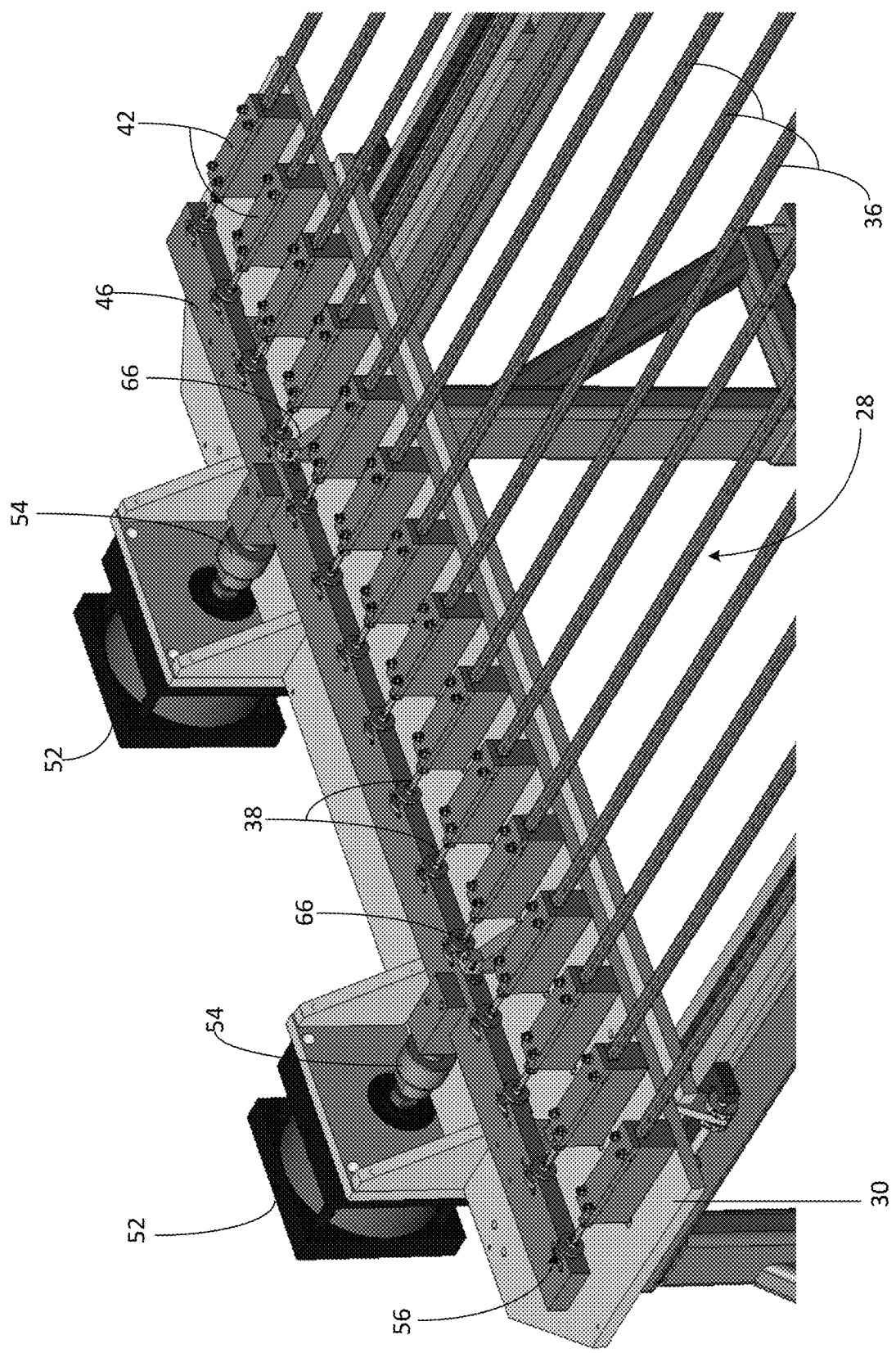
FIG. 4 shows a detailed top perspective view of the gun platform according to the present invention.
Figure 5:
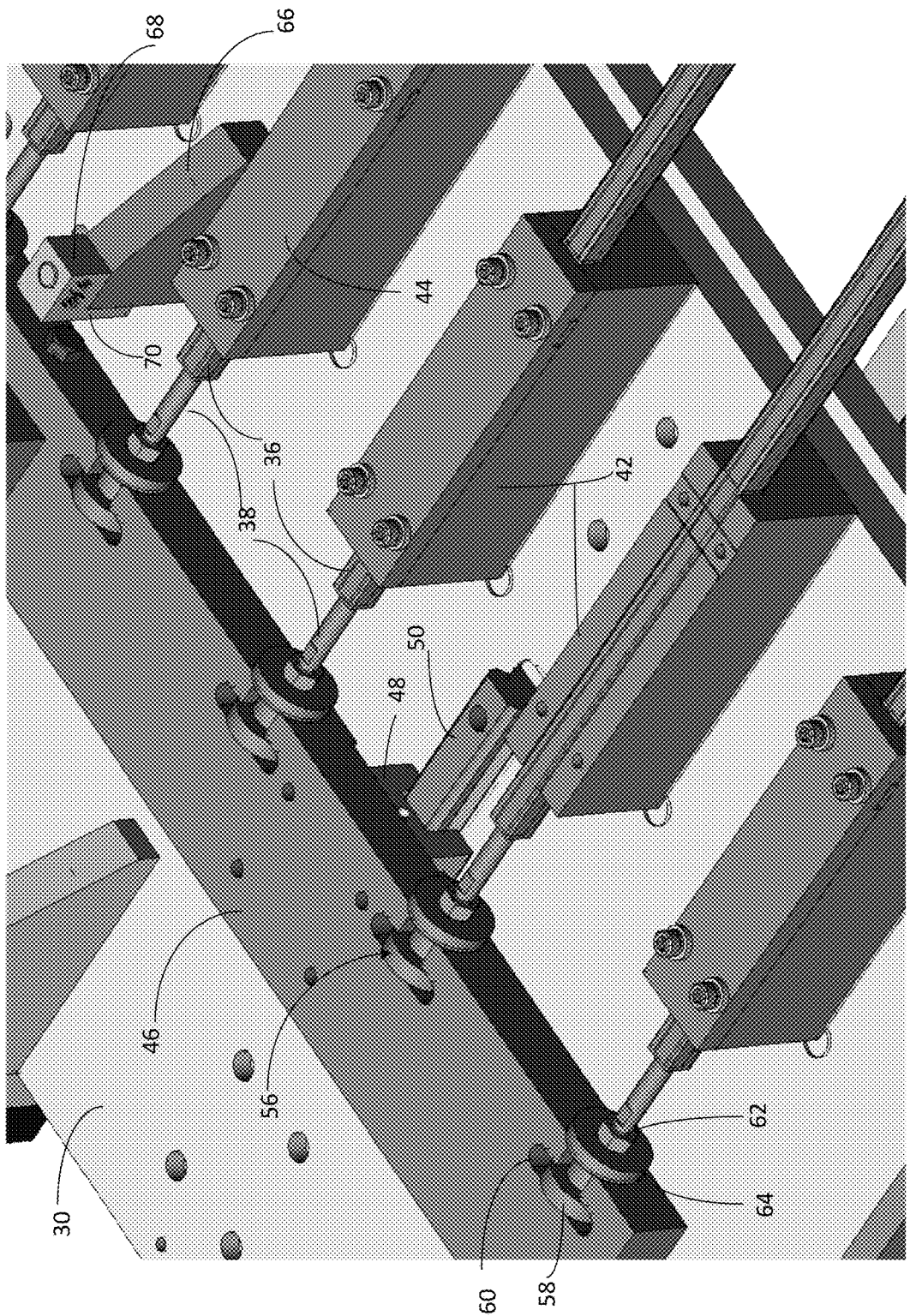
FIG. 5 shows a detailed top perspective view of the control bar connection with the actuator rod of the swedge guns according to the present invention.
Figure 6:
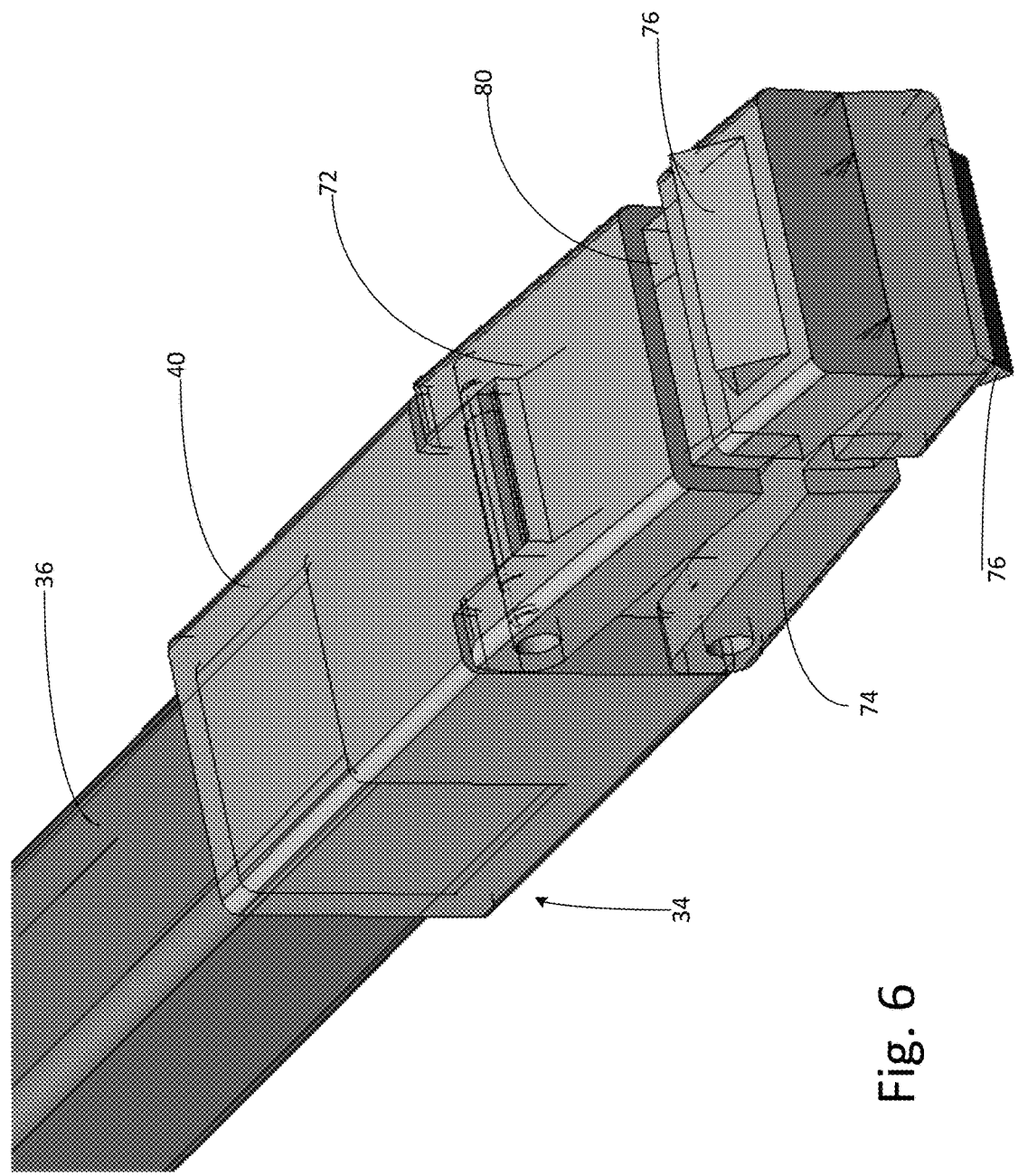
FIG. 6 shows a detailed perspective view of the swedging member disposed at the distal end of each elongated arm of the swedge guns according to the present invention.
Figure 7:
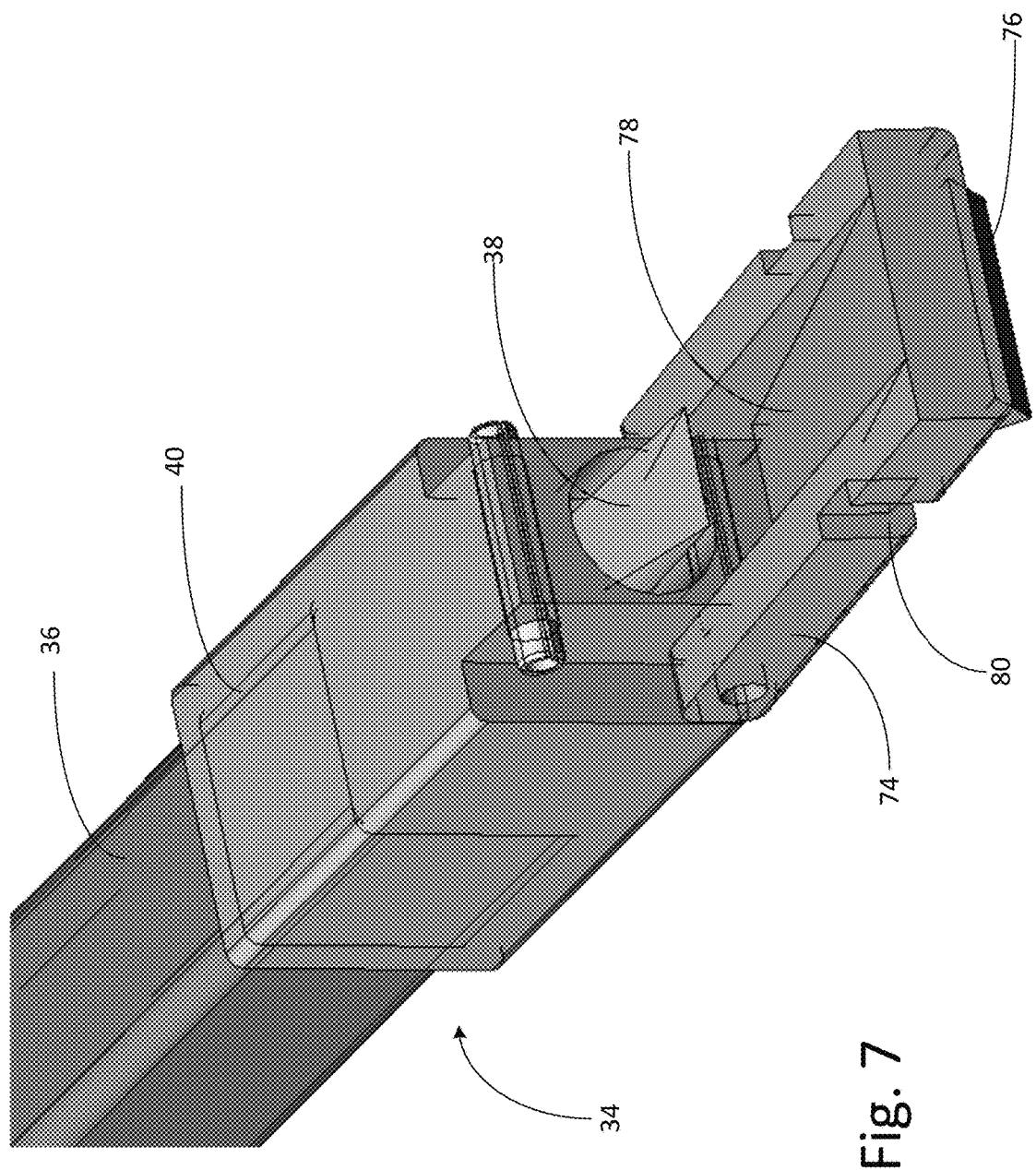
FIG. 7 shows a detailed perspective view of the swedging member of FIG. 6 with the upper swedge arm removed to show a distal end of the actuator rod and lower swedge arm according to the present invention.

Referring to FIGS. 4-7, in the illustrated embodiment, each of the swedge guns includes an elongated arm 36. Each elongated arm 36 houses an actuator rod 38 which is able to slide forward and back within elongated arm 36. Each actuator rod 38 is operatively associated with a swedging member, designated generally as 40, carried at distal end 34 of each elongated arm 36, as best shown in FIGS. 6 and 7. Each swedging member 40 is operable to form the indentation on the interior surface of a respective picket fencing member 24.

Referring to FIGS. 4 and 5, in the illustrated embodiment, a plurality of arm brackets 42 are carried on and laterally spaced across gun platform 30. Each of arm brackets 42 carries one of elongated arms 36 of swedge guns 28 in a fixed arrangement to hold each swedge gun 28 firmly to gun platform 30. In FIG. 5, a cap portion 44 to one of arm brackets 42 is removed to show elongated arm 36 seated in arm bracket 42.

Referring to FIGS. 4 and 5, in the illustrated embodiment, a control bar 46 is operatively connected to each actuator rod 38 of swedge guns 28. Accordingly, movement of control bar 46 causes a simultaneous movement of each actuator rod 38 forward or back within elongated arm 36 for operating each swedging member 40 at distal end 34.

Referring to FIG. 4, in the illustrated embodiment, a first distal end, designated generally as 56, of each actuator rod 38 is adjustably and releasably connected to control bar 46. Preferably, first distal end 56 of actuator rod 38 carries an end cap 58 which is received into a complementary slot 60 in control bar 46. First distal end 56 of actuator rod 38 is threaded and carries a nut 62 and washer 64 adjacent end cap 58, which can be tightened for biasing end cap 58 against the walls of slot 60. By adjusting the positon of end cap 58, nut 62 and washer 64 on first distal end 56, minor adjustments as to the position of actuator rod 38 relative to control bar 46 can be made. Such adjustment may be necessary to prevent excess actuation of swedging member 40.

Figure 8:
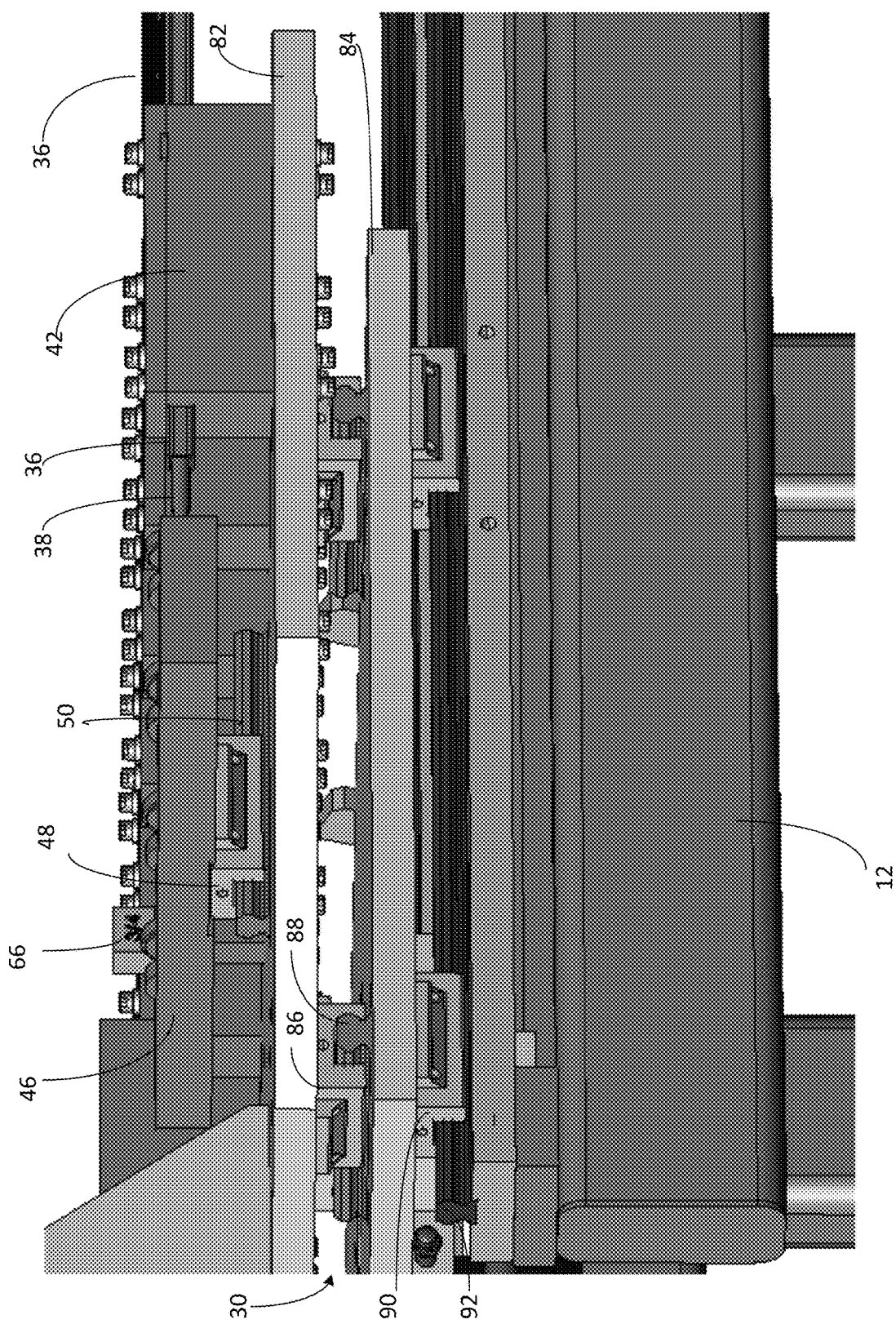
FIG. 8 shows a detailed side view of the gun platform carried on the elongated support frame according to the present invention.

Referring to FIGS. 5 and 8, in the illustrated embodiment, control bar 46 is slidably carried on gun platform 30 for moving forward and back to operate actuator rods 38. Control bar 46 includes at least one track bracket 48 slidably engaging a corresponding control track 50 mounted on gun platform 30 to provide a uniform movement of control bar 46 along the direction of control track 50 which extends in the direction of first axis 16 (FIG. 1).

Referring to FIG. 4, in the illustrated embodiment, a control bar actuator 52 is operatively connected to control bar 46 by a drive shaft 54. Control bar actuator 52 is operable to move control bar 46 between a first position in which actuator rod 38 is moved forward to bias swedging member 40 against the interior surface of a given picket fencing member, and a second position in which actuator rod 38 is retracted so that swedging member 40 is not biased against the interior surface of the picket fencing member. In one embodiment, control bar actuator 52 comprises at least one pneumatic cylinder in fluid communication with a compressed gas source for reciprocating drive shaft 54. Other alternative drive means may include a hydraulically operated reciprocating cylinder, an electric motor, or any other means well known to those skilled in the art capable of creating a reciprocating forward and back motion for directing control bar 46.

Referring to FIGS. 4 and 5, a stop block 66 is disposed along a movement path of control bar 46. Stop block 66 engages control bar 46 when moving forward to the first position to resist excess movement in the forward direction when operating the swedging members 40. As best shown in FIG. 5, stop block 66 can further include an interchangeable block member 68. The thickness of arm 70 of interchangeable block member 68 determines the extent of available forward movement of control bar 46. By swapping interchangeable block member 68 for one with a thicker of thinner arm 70, the available forward movement of control bar 46 can be adjusted, and thereby the movement of actuator rods 38.

Referring to FIGS. 6 and 7, each swedging member 40 comprises at least one swedge arm 72 pivotally carried at distal end 34 of each of elongated arms 36. In the illustrated embodiment, each swedging member 40 includes and upper swedge arm 72 and a lower swedge arm 74 that are both pivotally connected to distal end 34 of elongated arm 36. Each swedge arm 72, 74 includes a projection 76 which when biased against the interior surface of picket fencing members 24 forms the indentation which creates a complementary shaped projection on an outer surface of the picket fencing members that is received into a complementary recess of an adjacent rail fencing member for interlocking engagement between picket and rail fencing members 24, 26.

Referring to FIG. 7, upper swedge arm 72 has been removed in this illustration to reveal a second distal end of actuator rod 38. A tapered channel 78 is formed on an interior side of each of upper and lower swedge arms 72, 74 which receives the second distal end of actuator rod 38. The second distal end of actuator rod 38 is also tapered in a complementary manner so that when actuator rod 38 engages upper and lower swedge arms 72, 74 it is guided through channel 78 to provide a desired amount of separation and movement of each swedge arm. To facilitate a retraction of the swedge arms 72, 74 following a withdrawal of actuator rod 38, an rubber o-ring (not pictured) is seated in a retaining groove 80 formed into an exterior surface of swedge arms 72, 74.

Referring to FIG. 8, gun platform 30 is preferably laterally adjustable along second axis 18 (FIG. 2) perpendicular to first axis 16 (FIG. 1), wherein first axis 16 extends in a direction parallel with elongated support frame 12. This provides flexibility in adjusting gun platform 30 to different jig and picket/rail configurations. In the illustrated embodiment, gun platform, designated generally as 30, includes a first base plate 82 carrying swedge guns 28 on a top surface and having a track bracket 86 carried on a bottom surface. Track bracket 86 slidably engages a guide track 88 carried by a second base plate 84 so that the first base plate 82 is operable to shift laterally relative to second base plate 84 along second axis 18. Further, second base plate 84 includes a track bracket 90 slidably engaging a guide track 92 carried on support frame 12 so that second base plate 84 is operable to move laterally along support frame 12 in the direction of first axis 16 so that swedge guns 28 are received into the hollow interiors of picket fencing members 24.

Figure 9:
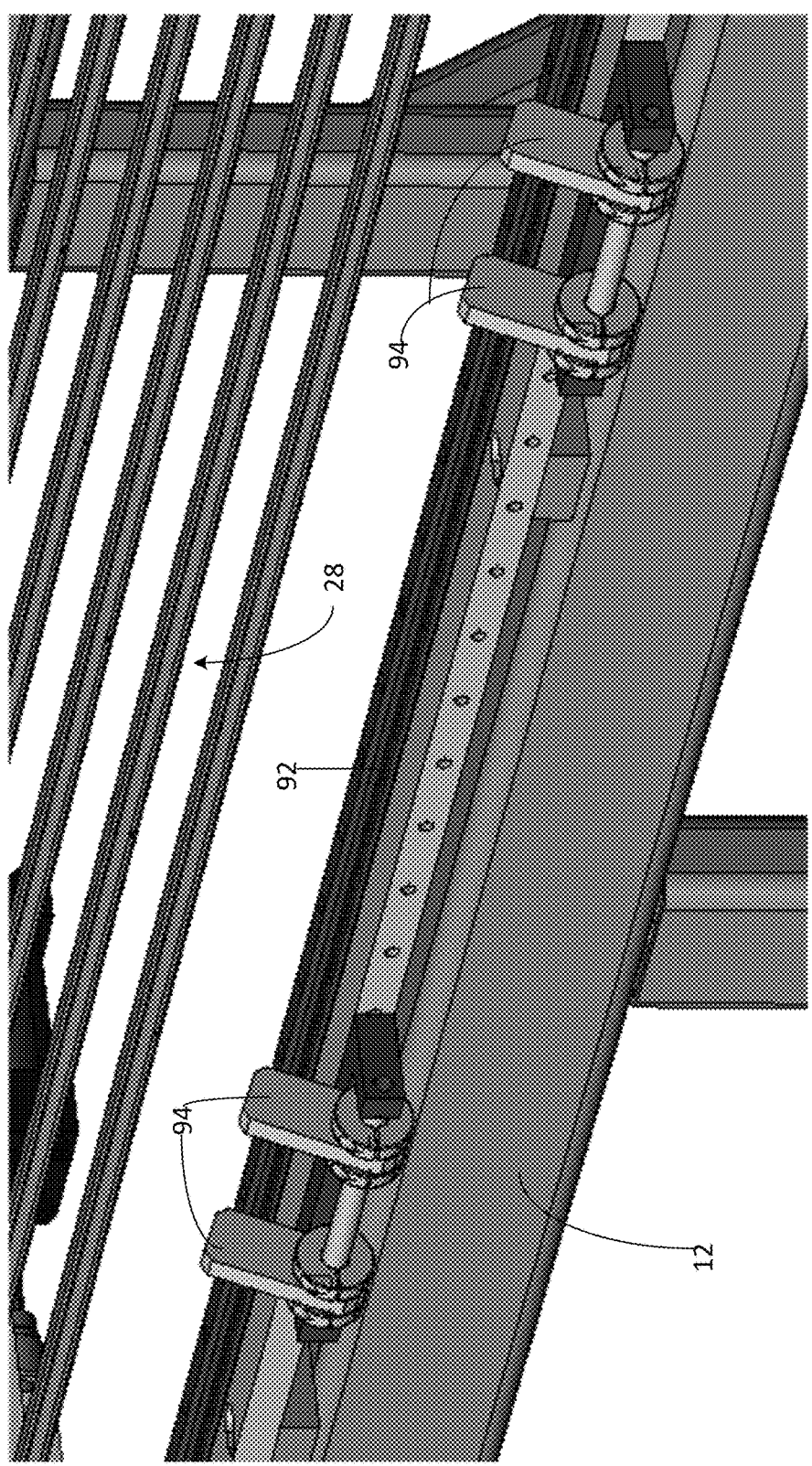
FIG. 9 shows a detailed side perspective view of a series of rotatable stop members carried on the elongated support frame according to the present invention.

Referring to FIG. 9, a series of rotatable stop members 94 are laterally spaced along elongated support frame 12 generally adjacent guide track 92. Stop members 94 are rotatable between a first position in which movement of at least one of jig 20 and gun platform 30 past a given stop member 94 is prevented by butting against the stop members, and a second position which does not interfere with movement of at least one of jig 20 and gun platform 30 as it moved along guide track 92. Stop members 94 are positioned relative to the location of rails disposed in jig 20 so that swedging members 40 are stopped within picket fencing members 24 at the location for interconnecting with rail fencing members 26. Rotatable stop members 94 are a reliable and easy to use system for correct placement of swedge guns 28 in picket fencing members 24 when moving one of jig 20 or gun platform 30 in a manual operation.

Figure 14:
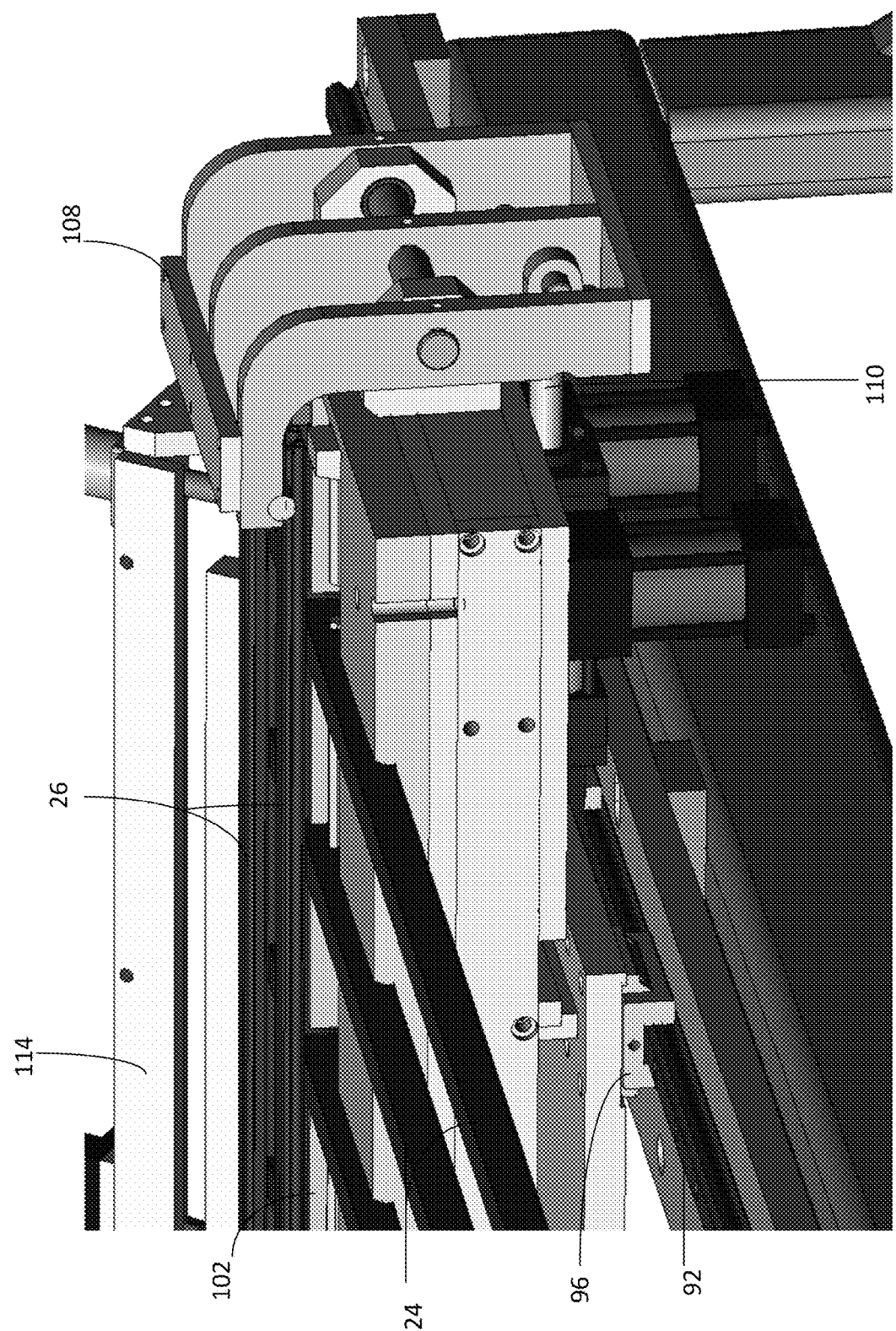
FIG. 14 shows a detailed perspective view of a rail clamp in an engaged position with the rail fencing members on the second jig portion according to the present invention; and, FIG. 15 shows a bottom view of the fencing assembly apparatus according to the present invention.

Referring to FIG. 14, in an embodiment of the present invention utilizing a jig 20 that is movable along support frame 12, jig 20 preferably includes a track bracket 96 slidably carried on guide track 92 mounted to support frame 12 for allowing lateral movement of jig 20 along the length of support frame 12 in the direction of first axis 16.

In this arrangement, gun platform 30 may be fixed to support frame 12 and insertion of swedge guns 28 into picket fencing members 24 is accomplished entirely by movement of jig 20 along support frame 12.

Figure 15:
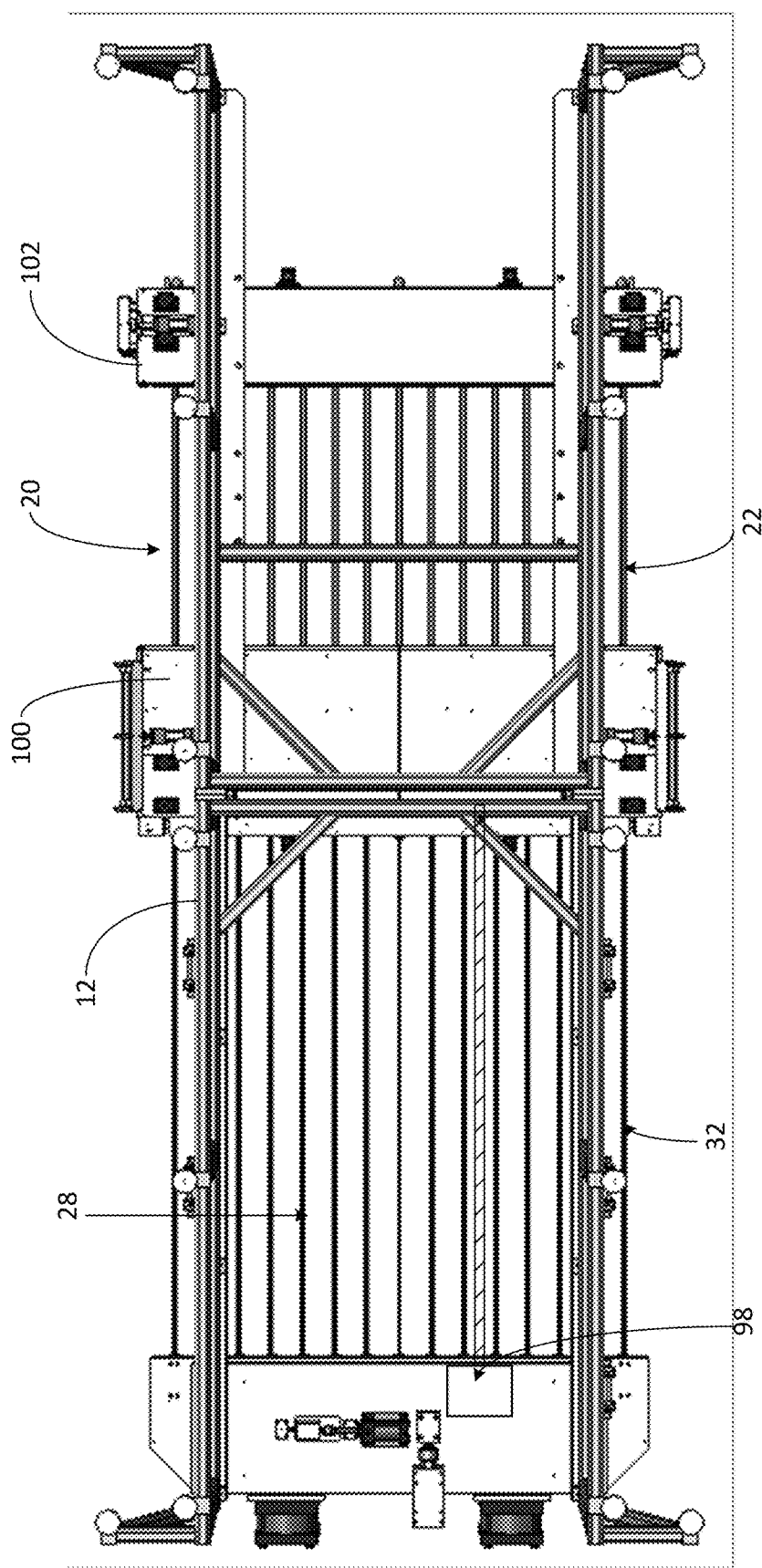

Referring to FIG. 15, in a further embodiment, a drive unit 98 is operatively associated with at least one of jig 20 and gun platform 30 for directing at least one of the jig and the gun platform along support frame 12. In the illustrated embodiment of FIG. 15, drive unit 98 is operatively connected to gun platform 30, which is slidably carried on guide tracks 92 of support frame 12. Drive unit 98 is a PLC controlled screw drive system in the illustrated embodiment, but may optionally be a chain drive, belt drive, or any other system sufficient for moving one of gun platform 30 and/or jig 20 along support frame 12 for inserting swedge guns 28 into picket fencing members 24 as detailed herein. Utilizing a computer controlled drive system eliminates the need for rotatable stop members 94.

Figure 11:
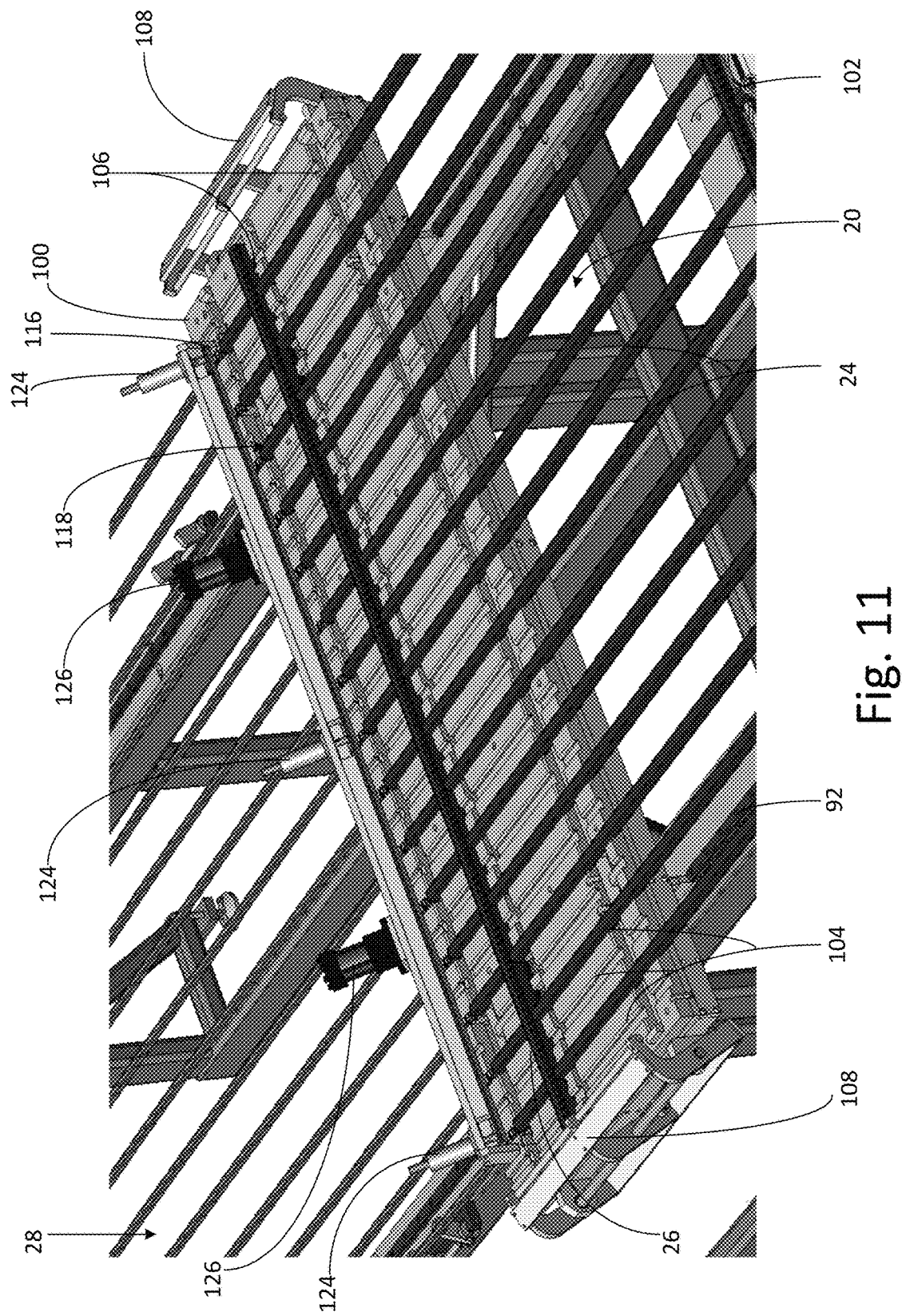
FIG. 11 shows a top perspective view of a first portion of the jig with a first picket control bar according to the present invention.
Figure 12:
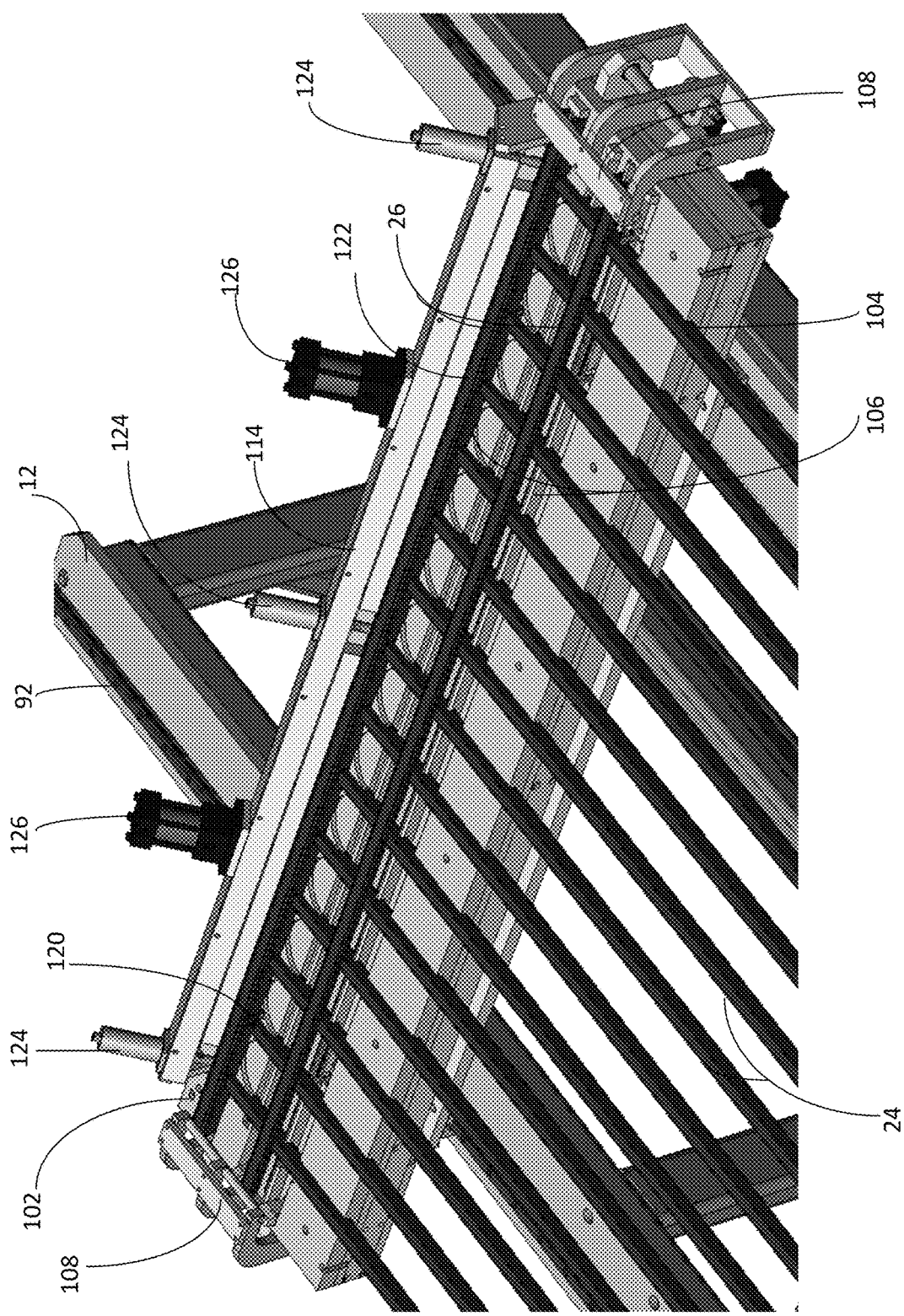
FIG. 12 shows a top perspective view of a second portion of the jig with a second picket control bar according to the present invention.

Referring to FIGS. 1, 11 and 12, in the illustrated embodiment, jig 20 is divided into two separate sections including a first end portion, designated generally as 100, and a second end portion, designated generally as 102. In the illustrated embodiment, first end portion 100 is fixed to support frame 12, while second end portion 102 is slidable along support frame 12 as detailed above in reference to FIG. 14. By providing second end portion 102 with the ability to adjust its position along support frame 12, the apparatus can adjust to accommodate picket fencing members 24 of various lengths.

Referring to FIGS. 10-12, in the illustrated embodiment, first end portion 100 and second end portion 102 of jig 20 each include a series of picket slots 104 for receiving picket fencing members 24, and a series of rail slots 106 for receiving rail fencing members 26. As best shown in FIG. 10, first end portion 100 of jig 20 includes slots in receiving section 25 adapted to receive distal end portions 34 of swedge arms 36 with swedging members 40 for guiding the swedge guns into the hollow interiors of picket fencing members 24.

Referring to FIGS. 11 and 12, jig 20 includes a plurality of rail clamps 108 on each of first end portion 100 and second end portion 102. Rail clamps 108 are operable between an engaged position pressing down on top of and securing rail fencing members 26 in rail slots 106, and a disengaged position allowing insertion and removal of rail fencing members 26 from rail slots 106. Rail clamps 108 are shown in the disengaged position in first end portion 100 of jig 20, and shown in the engaged position in second end portion 102. Referring to FIG. 14, in the illustrated embodiment, rail clamps 108 are pivotally mounted to a side of jig 20 and operatively connected to a clamp actuator 110. Clamp actuator 110 reciprocates between extended and retracted positions for moving the rail clamp between the engaged and disengage positions. In one embodiment, clamp actuator 110 comprises at least one pneumatic cylinder in fluid communication with a compressed gas source for reciprocating between extended and retracted positions. Other alternative drive means may include a hydraulically operated reciprocating cylinder, an electric motor, or any other means well known to those skilled in the art capable of creating a reciprocating forward and back motion for directing rail clamps 108.

Referring to FIGS. 11 and 12, a first picket control bar, designated generally as 112, is carried by first end portion 100 of jig 20, and a second picket control bar, designated generally as 114, is carried by second end portion 102 of jig 20 opposite first end portion 100, wherein first and second picket control bars 112, 114 extend perpendicular to the longitudinal axis of picket slots 104, which extend along first axis 16.

Referring to FIG. 11, first picket control bar 112 is operable between an extended position in which a retaining bar 116 is lowered to engage a first distal end portion 118 of picket fencing members 24 for aligning and securing picket fencing members 24 in picket slots 104, and a retracted position in which retaining bar 116 is withdrawn allowing insertion and removal of picket fencing members 24 in picket slots 104. In the illustrated embodiment, retaining bar 116 of first picket control bar 112 presses down on top of picket fencing member 24 when in the extended position to ensure picket fencing members 24 are properly seated and secured in picket slots 104. FIG. 11 shows the retaining bar 116 in the retracted position.

Figure 13:
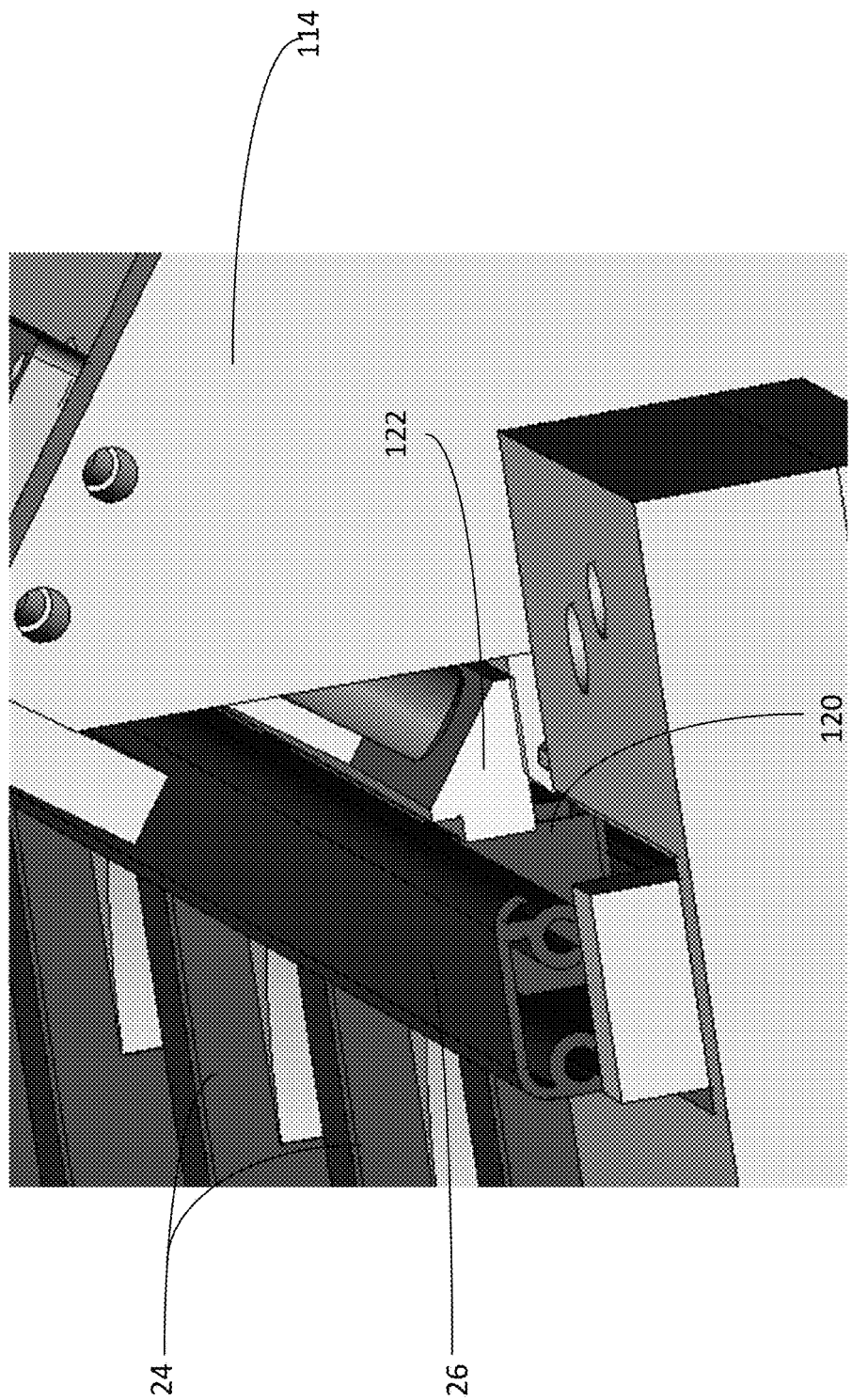
FIG. 13 shows a detailed side view of the second picket control bar in an extended position engaging a distal end portion of the picket fencing members according to the present invention.

Referring to FIG. 12, second picket control bar 114 is likewise operable between an extended position in which a retaining bar 122 is lowered to engage a second distal end 120 of picket fencing members 24 for aligning and securing picket fencing members 24 in picket slots 104, and a retracted position in which retaining bar 122 is withdrawn allowing insertion and removal of picket fencing members 24 in picket slots 104. Further referring to FIG. 13, in the illustrated embodiment, retaining bar 122 of second picket control bar 112 presses against the distal end portion 120 of each picket fencing member 24 from behind for pushing each picket fencing member 24 into uniform alignment and securing in picket slots 104.

Referring to FIGS. 11 and 12, in the illustrated embodiment, first and second picket control bars 112 and 114 each include a series of guide rods 124 laterally spaced along the length of the picket control bars. Guide rods 124 help maintain a uniform engagement of retaining bars 116 and 122 with picket fencing members 24. Additionally, in the illustrated embodiment, to operate each of first and second picket control bars 112 and 114 between engaged and retracted positions, a picket control bar actuator 126 is carried by each of picket control bars 112 and 114. Picket control bar actuator 126 reciprocates between extended and retracted positions for moving retaining bars 116 and 122 between the extended and retracted positions. In one embodiment, picket control bar actuator 126 comprises at least one pneumatic cylinder in fluid communication with a compressed gas source for reciprocating between extended and retracted positions. Other alternative drive means may include a hydraulically operated reciprocating cylinder, an electric motor, or any other means well known to those skilled in the art capable of creating a reciprocating forward and back motion for directing retaining bars 116 and 122.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A fencing assembly apparatus comprising:
   an elongated support frame;
   a jig carried at a first section of said support frame;
   said jig adapted for receiving a plurality of picket and rail fencing members in a pre-defined arrangement for assembly;
   a plurality of swedge guns mounted to a gun platform;
   said gun platform carried at a second section of said support frame so that distal ends of said swedge guns are aligned with a receiving section of said jig;
   wherein at least one of said jig and said gun platform is slidable along said support frame so that said swedge guns are received into hollow interiors of said picket fencing members and repositionable along the length of said picket fencing members;
   a plurality of arm brackets carried on and laterally spaced across said gun platform, wherein each of said arm brackets carries an elongated arm of said swedge guns in a fixed arrangement;
   wherein said swedge guns are operable to form an indentation on an interior surface of said picket fencing members causing an interlocking engagement with one of said rail fencing members; and,
   a drive unit operatively associated with at least one of said jig and said gun platform for directing at least one of said jig and said gun platform along said support frame.

2. The apparatus of claim 1 wherein each of said swedge guns include an elongated arm housing an actuator rod, said actuator rod operatively associated with a swedging member carried at a distal end of said elongated arm, and wherein said swedging member is operable to form said indentation on said interior surface of said picket fencing members.

3. The apparatus of claim 2 including a control bar operatively connected to each said actuator rod of said swedge guns, wherein movement of said control bar causes a simultaneous movement of each said actuator rod for operating said swedging member.

4. The apparatus of claim 3 wherein said control bar is slidably carried on said gun platform, and wherein said control bar includes at least one track bracket slidably engaging a corresponding control track mounted on said gun platform to provide a uniform movement of said control bar along a direction of said control track.

5. The apparatus of claim 3 including a stop block disposed along a movement path of said control bar, wherein said stop block engages said control bar to resist excess movement in a forward direction when operating said swedging member.

6. The apparatus of claim 3 wherein a first distal end of each said actuator rod is adjustably and releasably connected to said control bar.

7. The apparatus of claim 3 including a control bar actuator operatively connected to said control bar and operable to move said control bar between a first position in which said actuator rod biases said swedging member against said interior surface of said picket fencing members, and a second position in which said actuator rod is retracted so that said swedging member is not biased against said interior surface of said picket fencing members.

8. The apparatus of claim 2 wherein said swedging member comprises at least one swedge arm pivotally carried at said distal end of each of said elongated arms, and wherein said swedge arm includes a projection which when biased against said interior surface of said picket fencing members forms said indentation which creates a complementary shaped projection on an outer surface of said picket fencing members that is received into a complementary recess of an adjacent rail fencing member for interlocking engagement between said picket and rail fencing members.

9. The apparatus of claim 1 wherein said gun platform is laterally adjustable along a second axis perpendicular to a first axis extending in a direction parallel with the elongated support frame.

10. The apparatus of claim 9 wherein said gun platform includes a first base plate carrying said swedge guns on a top surface and having a track bracket carried on a bottom surface; said track bracket slidably engaging a guide track carried by a second base plate so that said first base plate is operable to shift laterally relative to said second base plate along said second axis.

11. The apparatus of claim 10 wherein said second base plate includes a track bracket slidably engaging a guide track carried on said support frame so that said second base plate is operable to move laterally along said first axis.

12. The apparatus of claim 1 including a series of rotatable stop members laterally spaced along said support frame, wherein said stop members are rotatable between a first position in which movement of at least one of said jig and said gun platform past a given said stop member is prevented, and a second position which does not interfere with movement of at least one of said jig and said gun platform.

13. The apparatus of claim 1 wherein said jig includes a series of picket slots for receiving said picket fencing members, and a series of rail slots for receiving said rail fencing members.

14. The apparatus of claim 13 wherein said jig includes a plurality of rail clamps operable between an engaged position securing said rail fencing members in said rail slots, and a disengaged position allowing insertion and removal of said rail fencing members from said rail slots.

15. The apparatus of claim 13 including a first picket control bar disposed generally at a first end portion of said jig, and a second picket control bar disposed generally at a second end portion of said jig opposite said first end portion, wherein said first and second picket control bars extend perpendicular to a longitudinal axis of said picket slots;
  said first picket control bar operable between an extended position engaging a first distal end of said picket fencing members for aligning and securing said picket fencing members in said picket slots, and a retracted position allowing insertion and removal of said picket fencing members; and,
  said second picket control bar operable between an extended position engaging a second distal end of said picket fencing members for aligning and securing said picket fencing members in said picket slots, and a retracted position allowing insertion and removal of said picket fencing members.

16. The apparatus of claim 1 wherein said jig includes a track bracket slidably carried on a guide track mounted to said support frame for allowing lateral movement of said jig along said support frame.

17. A fencing assembly apparatus comprising:
an elongated support frame;
a jig carried at a first section of said support frame;
said jig adapted for receiving a plurality of picket and rail fencing members in a pre-defined arrangement for assembly;
a plurality of swedge guns mounted to a gun platform;
said gun platform carried at a second section of said support frame so that distal ends of said swedge guns are aligned with a receiving section of said jig, and wherein said gun platform is laterally adjustable along a second axis perpendicular to a first axis extending in a direction parallel with said elongated support frame
wherein said gun platform is slidable along said support frame so that said swedge guns are received into hollow interiors of said picket fencing members and repositionable along the length of said picket fencing members; and,
wherein said swedge guns are operable to form an indentation on an interior surface of said picket fencing members causing an interlocking engagement with one of said rail fencing members.

18. A fencing assembly apparatus comprising:
an elongated support frame;
a jig carried at a first section of said support frame;
said jig including a series of picket slots for receiving picket fencing members, and a series of rail slots for receiving rail fencing members;
at least one rail clamp included in said jig operable to engage and secure said rail fencing members in said rail slots;
at least one picket control bar included in said jig operable to engage a distal end of said picket fencing members to align and secure said picket fencing members in said picket slots;
a plurality of swedge guns mounted to a gun platform;
said gun platform carried at a second section of said support frame so that distal ends of said swedge guns are aligned with a receiving section of said jig;
wherein at least one of said jig and said gun platform is slidable along said support frame so that said swedge guns are received into hollow interiors of said picket fencing members and repositionable along the length of said picket fencing members; and,
wherein said swedge guns are operable to form an indentation on an interior surface of said picket fencing members causing an interlocking engagement with one of said rail fencing members.

* * * * *